United States Patent [19]

Grant et al.

[11] Patent Number: 5,243,477
[45] Date of Patent: Sep. 7, 1993

[54] APPARATUS FOR THREADING MAGNETIC TAPE FROM A SINGLE REEL CARTRIDGE IN A ROTARY HEAD TAPE TRANSPORT

[75] Inventors: Frederic F. Grant, Bellflower; Vincent J. Piarulli, Simi Valley, both of Calif.

[73] Assignee: Datatape Incorporated, Pasadena, Calif.

[21] Appl. No.: 809,189

[22] Filed: Dec. 17, 1991

[51] Int. Cl.$^5$ .................... G11B 15/66; G11B 15/32
[52] U.S. Cl. ........................... 360/95; 242/195
[58] Field of Search ................ 360/85, 93, 95; 242/55.18, 55.19 A, 55.19 R, 193–197

[56] References Cited

U.S. PATENT DOCUMENTS

| | | | |
|---|---|---|---|
| 4,426,047 | 1/1984 | Richard et al. | 242/197 |
| 4,608,614 | 8/1986 | Rinkleib et al. | 360/95 |
| 4,679,747 | 7/1987 | Smith | 242/195 |
| 4,742,407 | 5/1988 | Smith et al. | 242/195 |
| 4,809,099 | 2/1989 | Murphy et al. | 360/95 |
| 4,826,101 | 5/1989 | Smith | 242/195 |
| 4,826,102 | 5/1989 | Kato et al. | 242/195 |
| 4,987,504 | 1/1991 | Inoue | 360/95 |
| 4,991,037 | 2/1991 | Shimizu et al. | 360/95 |
| 5,046,168 | 9/1991 | Ohsaki | 360/95 |

*Primary Examiner*—Stuart S. Levy
*Assistant Examiner*—Jefferson Evans
*Attorney, Agent, or Firm*—William F. Noval

[57] ABSTRACT

A magnetic tape recorder includes a rotary head scanner, a cartridge for containing a single reel of magnetic tape having a leader block at its end, a take-up reel and a leader block channel defining a tape path from the cartridge, past the rotary head scanner, to the take-up reel. A tape threading apparatus includes a first rotatably mounted arm segment, a first motor for rotating the first arm segment, a second arm segment rotatably mounted to the first arm segment, a second motor mounted on the first arm segment for rotating the second arm segment and a leader block carrier mounted on the end of the second arm segment for engaging the leader block to move it along the leader block channel.

4 Claims, 2 Drawing Sheets

APPARATUS FOR THREADING MAGNETIC TAPE FROM A SINGLE REEL CARTRIDGE IN A ROTARY HEAD TAPE TRANSPORT

FIELD OF INVENTION

The invention relates in general to magnetic tape threading apparatus in magnetic tape recorders and more particularly to apparatus for threading magnetic tape from a single reel cartridge in a rotary head tape transport.

BACKGROUND OF THE INVENTION

Magnetic tape recorders (longitudinal or rotary) record and playback information on and from magnetic tape transported past a stationary or rotary magnetic head(s). The magnetic tape is contained in a two reel cassette or in a single reel cartridge. A widely used single reel cartridge is the IBM 3480 cartridge which includes a single reel of magnetic tape contained in a rectangular cartridge. A leader block is connected to the free end of the tape and is accessible (1) to withdraw the leader block from the cartridge, and (2) to thread it along a tape transport path of a magnetic tape recorder to a take-up reel. It is desirable that the tape threading apparatus be reliable, cost effective and provide positive control during the entire tape threading and unthreading operation. The tape threading arrangements disclosed in the following patents have not satisfied all of these needs.

U.S. Pat. No. 4,679,747, issued Jul. 14, 1987, inventor Smith.

U.S. Pat. No. 4,742,407, issued May 3, 1988, inventors Smith et al.

U.S. Pat. No. 4,809,099, issued Feb. 28, 1989, inventors Murphy et al.

U.S. Pat. No. 4,426,047, issued Jan. 17, 1984, inventors Richard et al.

SUMMARY OF THE INVENTION

According to the present invention, there is provided in a rotary head magnetic tape recorder, apparatus for threading magnetic tape from a single reel magnetic tape cartridge, which is reliable, cost effective and which effects positive control during the magnetic tape threading and unthreading operation. The tape threading apparatus includes first and second articulated arm segments, a first motor for rotating the first arm segment and a second motor mounted on the first arm segment for rotating the second arm segment. Preferably, the second arm segment mounts a leader block carrier on flexing elements which allow the leader block carrier to change elevation as tape is threaded in a helical path around a rotary head.

DESCRIPTION OF THE PREFERRED EMBODIMENTS

Figure 1:
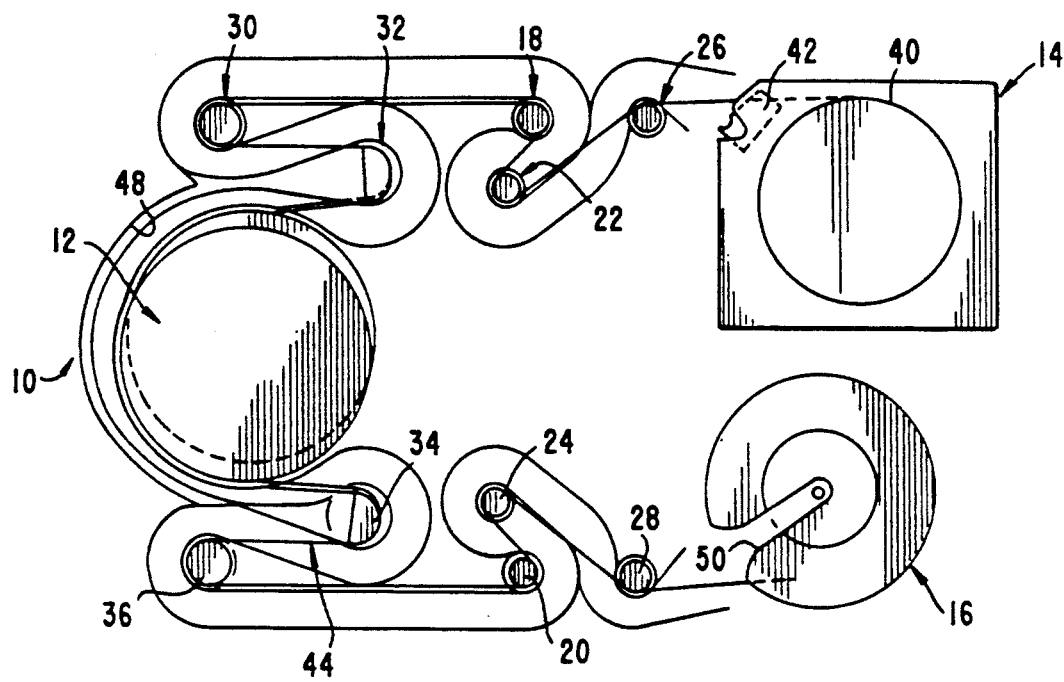
FIGS. 1 and 2 are diagrammatic top plan views of a rotary head recorder incorporating an embodiment of the present invention.
Figure 2:
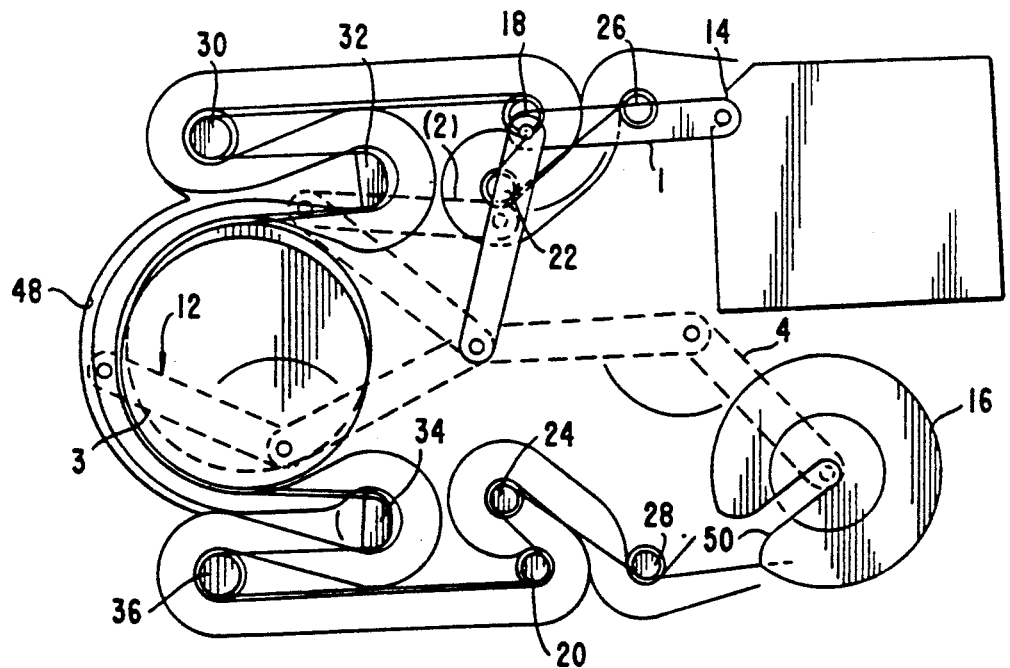
Figure 3:
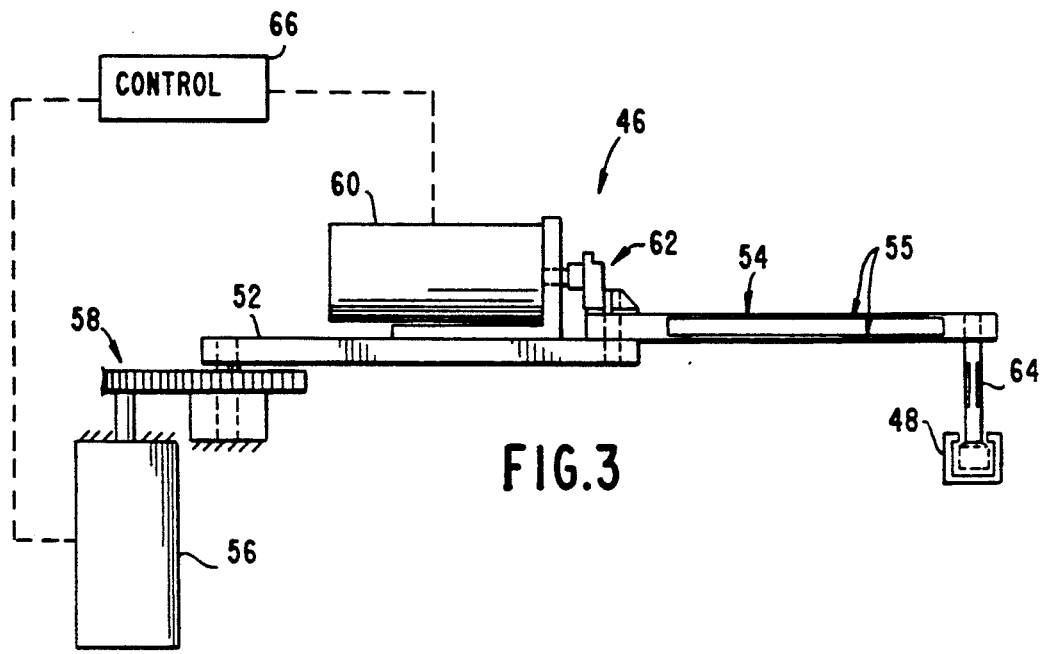
FIG. 3 is a side elevational view of the embodiment incorporated in the apparatus of FIG. 1.

Referring now to FIGS. 1-3, there will be described an embodiment of the present invention as incorporated in a rotary head magnetic tape recorder. As shown in FIG. 1, magnetic tape recorder 10 includes a rotary head scanner 12, a removable single reel magnetic tape cartridge 14 (such as the IBM 3480 cartridge), a take up reel 16, capstans 18, 20, compliance rollers (reeling servo sensors) 22, 24, guide rollers 26, 28, air bearings 30, 32, 34, 36 and leader block channel 38. Cartridge 14 contains a reel 40 of magnetic tape 41, an end of which is attached to leader block 42.

According to the present invention, tape threading apparatus 46 threads magnetic tape 41 from cartridge 14, along tape path 44 around rollers 26, 22, capstan 18, air bearings 30, 32, around rotary head scanner 12 in a helical path, around air bearings 34, 36, capstan 20, guide rollers 24, 28, and then to taken up on take up reel 16. Threading apparatus 46 moves leader block 42 from cartridge 14 along leader block channel 48 to slot 50 in take-up reel 16. Reel 16 is rotated to take-up magnetic tape.

As shown in FIGS. 2 and 3, magnetic tape threading apparatus 46 includes first and second articulated arm segments 52 and 54. First motor 56 rotates first arm 52 through gear chain 58. A second motor 60 mounted on first arm segment 52 rotates second arm segment 54 through gear chain 62. Mounted at the end of arm segment 54 is leader block carrier 64 which engages leader block 42 to move it through the path defined by channel 48.

Second arm segment 54 is preferably formed from thin flexing elements 55 to permit following of changes in elevation of channel 48 to follow the helical tape path around scanner 12. The flexing elements are wide to give lateral stiffness and to control the horizontal position of leader block 42 in response to the robotic control imposed by motors 56, 60. The flexing elements are thin so that the leader block channel 48 can control the elevation location of leader block 42. In this way, leader block 42 can be traversed through the path defined by leader block channel 48, around all of the tape transport path elements from cartridge 14 to take-up reel 16.

As shown in FIG. 3, arm segments 52, 54 are rotated by motors 56, 60 to a position, (1) to extract or insert leader block 42 relative to cartridge 14. In position (2), the leader block 42 is mover around compliance roller 22. In position (3), arm segments 52, 54 carry leader block 42 around scanner 12. In position (4), arm segments 52, 54 are positioned for a run mode with the leader block inserted in take-up reel 6. Motors 56, 60 are controlled by control 66 to rotate arm segments 52, 54 to follow the threading path through positions (1), (2), (3), (4) and in reverse to follow the unthreading path through positions (4), (3), (2), (1).

Figure 4:
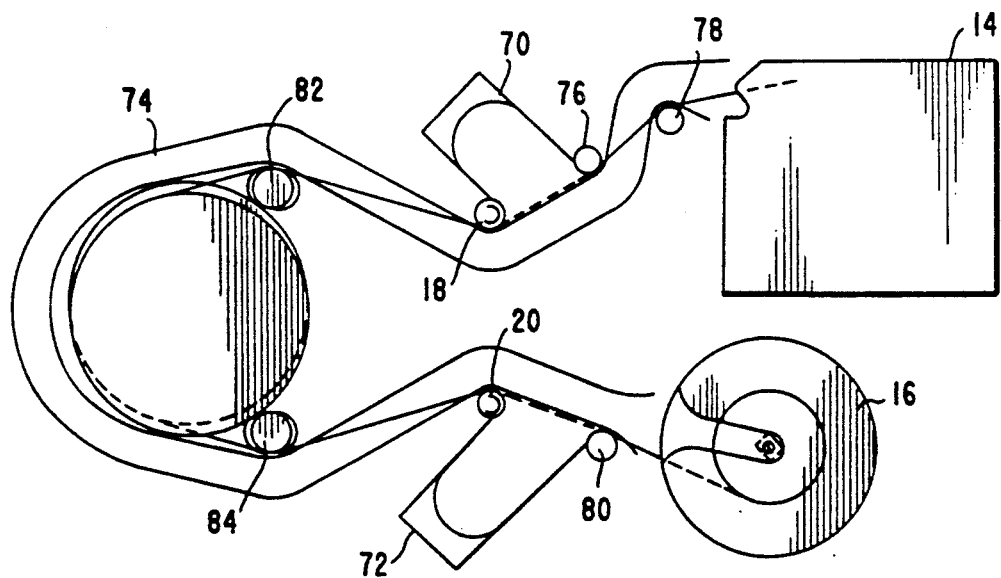
FIG. 4 is a diagrammatic top plan view of another rotary head recorder in which the present invention is useful.

Referring to FIG. 4, there is shown a modification to the tape path of FIG. 1 in which two vacuum columns 80, 72 control tape tension during tape transport, thus eliminating compliance rollers 22, 24 and providing a straighter leader block channel and tape threading and unthreading path. Guide rollers 76, 78 and 80 and tilt air bearings 82, 84 are also provided.

What is claimed is:

1. A magnetic tape recorder comprising:
a rotary head scanner;

means for receiving a cartridge containing a single reel of magnetic tape having an end attached to a leader block;

a take up reel;

a leader block channel defining a tape path from said receiving means, past said rotary head scanner to said take-up reel; and magnetic tape threading means for threading said leader block around said leader block channel from said cartridge, past said rotary head scanner to said take-up reel, said threading means including a first rotatably mounted arm segment, a first motor for rotating said first arm segment, a second arm segment rotatably mounted to said first arm segment, a second motor mounted on said first arm segment for rotating said second arm segment and a leader block carrier mounted on said second arm segment for engaging said leader block.

2. The recorder of claim 1 wherein said leader block channel has a portion which changes elevation relative to other portions thereof and wherein said second arm segment is capable of flexing to move said leader block through said portion.

3. The recorder of claim 2 wherein said second arm segment includes a plurality of thin segments.

4. The recorder of claim 1 including control means for controlling the rotation of said first and second arm segments.

* * * * *